United States Patent Office 3,496,055
Patented Feb. 17, 1970

3,496,055
FOAM-BACKED CARPET
Albert H. Hart, Jr., Dalton, Ga., assignor to Colonial Chemical Corporation, Dalton, Ga., a corporation of Georgia
No Drawing. Filed Oct. 31, 1967, Ser. No. 679,546
Int. Cl. D03d 27/12; B32b 5/18; C08j 1/36
U.S. Cl. 161—66       23 Claims

ABSTRACT OF THE DISCLOSURE

A foam-rubber-backed carpet fabric wherein the foam rubber contains a polysiloxane which is a liquid at ordinary temperatures in an amount sufficient to increase the bond strength between the foam rubber and the carpet.

---

The present invention relates to a carpet fabric and more particularly to a carpet having a foam rubber backing. The invention provides a novel foam rubber backing having high bond strength to the carpet and therefore being extremely resistant to delamination. Improved bond strength is provided by the incorporation in the foam rubber of a polysiloxane or a copolymer of polysiloxane and polyoxyalkylene ethers.

The term carpet as used herein refers to a textile fabric for soft floor covering. The most common types of carpets in use at the present time comprise a fabric base with erect yarn tufts extending upwardly from the base and constituting the pile. Various methods are known for constructing the base and securing the pile yarns to it. However, the present invention is particularly concerned with tufted carpets which comprise woven backing, usually jute, with loops of yarn pushed through it to form the tufts. The loops can be cut if desired. The pile yarns are secured to the backing, for example with a rubber latex. A secondary backing is frequently applied over the latex, to provide dimensional stability to the fabric and protect the latex and pile yarns from rubbing.

Carpets of this type often are laid on a floor over an underlay pad which may be a foam rubber product. It also is known to use a foam rubber obtained by foaming a rubber latex directly under one of the backings and adhered to the carpet. For example, it is possible to apply latex foam to the primary backing to adhere the pile yarns. Theoretically, this can eliminate the need for a secondary backing and an underlay material.

The present invention is concerned with the adhesion of a foamed latex of this type to the back of the carpet and especially to the primary backing and tufting yarn as described above. The principal object of the invention is to provide an increase in bond strength and a reduction of tendency to delaminate. At present, it is customary to accept foam rubber-backed carpet having low bond strength, even as low as 1 pound per inch. In accordance with the present invention, it has been found possible to increase the bond strength or delamination force to 4–7 pounds per inch. Briefly stated, this is accomplished by incorporating a polysiloxane or a copolymer of polysiloxane and polyalkylene ethers into the latex from which the foam rubber is produced.

The latex which is foamed comprises a polymeric compound dispersed in the form of small particles in a liquid, usually water. The preferred polymeric compounds are vulcanizable rubbers, including natural rubber and various synthetic rubbers. As suitable synthetic rubbers, there may be mentioned elastomeric homopolymers of conjugated dienes such as isoprene, butadiene, 2-chlorobutadiene and their copolymers with each other or with various monoethylenically unsaturated monomers such as styrene and acrylonitrile. Especially useful are copolymers of styrene and butadiene, known as SBR and containing about 10 to 40% by weight styrene and 90 to 60% by weight butadiene as well as natural rubber, which is polyisoprene. Mixtures of such rubbers also may be used.

These polymers are used in the form of a latex which is a stabilized dispersion of fine polymer particles in water. Typical dispersions contain about 62 to 85% by weight rubber solids. The latex also may contain any conventional additives for foam rubber latex. These include vulcanizing agents such as sulphur, accelerators, gel inducing agents, tack reducing agents, inert fillers, antioxidants, dispersing agents, pigments and the like.

Typical formulations contain the following materials.

| Part A: | Parts dry, by weight |
|---|---|
| Cold SBR latex | 0–100 |
| Natural latex | 0–100 |
| Stabilizer soap | 1–5 |
| Antioxidant | 1–3 |
| Inert filler | 0–200 |
| Part B: | |
| Zinc diethyl dithiocarbamate | 0.5–2.0 |
| Zinc mercaptobenzo thiazole | 0.5–2.0 |
| Sulfur | 1.5–3.0 |
| KOH | 0.0–0.4 |
| Zinc oxide | 3.0–6.0 |
| Amine sensitizer | 0.0–2.0 |
| Gelant | 1.0–5.0 |

As is known, there are two basically different techniques for producing foam from a rubber latex. In one technique, a gas liberating compound is added to the latex which is capable of releasing gas through chemical action when heated. After the latex is deposited at the foaming site, it is heated to cause the foam to gel and, if necessary, to activate the gas liberating compound. During gellation, the separate rubber particles join together in solid rubber. If the gas liberating compound is heat activated, it should be selected to decompose at a temperature below the gel temperature of the latex; this will permit the latex to froth up and the bubbles thus formed to be trapped by the gelled rubber. After gellation, the rubber is cured by further heating. Typical gellation temperatures are 25 to 121° C. and typical cure temperatures are 121 to 165° C.

The second method of foaming involves mechanically agitating the latex while gas, e.g. air, is introduced to form a froth. The latex may be chilled to favor trapping small bubbles. After foaming, the latex is extruded, gelled and cured as described above.

Both of these methods are well known to those skilled in the art, and therefore it is unnecessary to describe operating conditions in detail. Further information may be found in standard textbooks.

The polysiloxanes used in accordance with the present invention are fluid polymers containing siloxane groups, i.e. polymers of the structure

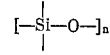

where $n$ is an integer of about 8 to 200. Preferred polymers have the structure

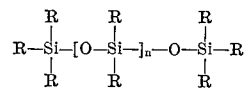

where R is alkyl, preferably lower alkyl, aryl, preferably monocarbocylic aryl, hydroxy alkyl, aminoalkyl, and cyanoalkyl, the groups R being all the same or different.

The polysiloxanes which have produced the most satisfactory products are liquid polydimethylsiloxanes, i.e. having the formula

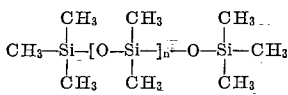

These polymers have the lowest surface tension of the polysiloxanes investigated and this low surface tension is believed to be related to their superiority.

The copolymers referred to above are liquids containing polysiloxanes of the above formulas in which one or more of the groups R have been replaced with a group

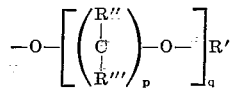

where $p$ and $q$ are integers and $R'$ may be another polysiloxane, hydrogen or one of the groups R. The groups $R''$ and $R'''$ may be hydrogen or lower alkyl such as methyl or ethyl. For example, the polyoxyalkylene moiety may be a polymer of ethylene oxide, propylene oxide, butylene oxide or tetrahydrofuran.

The amount of polysiloxane or copolymer added to the latex will be about 0.05–2.0% by weight of the rubber. Where larger quantities may be used, they have been found unnecessary and therefore undesirably expensive. Significantly larger quantities may have an undesirable effect on the physical properties of the rubber. Optimum quantities may be determined by routine experiment.

The fabrics to which the foam backing is applied may comprise any known fiber or filament. As fibers there may be mentioned, for example, rayon, polyester such as polyethylene terephthalate, nylon such as Nylon 6, Nylon 66 and Nylon 11, polyacrylonitrile, copolymers of acrylonitrile and other monomers such as vinyl chloride, polyolefins such as polyethylene or polypropylene, Saran, especially copolymers of vinylidene chloride and vinyl chloride as well as natural fibers including wool, cotton and the like. As a backing material, there may be used a woven or otherwise formed fabric, or even a plastic film or non-woven fabric. The invention is especially useful with fabrics having a woven jute backing.

The following examples illustrate the invention. All parts and percentages are by weight, unless otherwise indicated.

EXAMPLE 1

A latex was prepared containing the following ingredients:

| Ingredients | Percent Solids | Parts by Weight (Dry Basis) |
|---|---|---|
| Part A: | | |
| Goodyear SBR Latex 5133 | 68.5 | 20 |
| Potassium oleate | 18 | 1.5 |
| Goodyear SBR Latex FRS 221 | 70 | 40 |
| Natural Rubber Latex | 62 | 40 |
| CWF Alkali Washed Clay | Dry | 20 |
| LU-600 Feldspar | Dry | 70 |
| Hydrated Alumina | Dry | 30 |
| Part B: | | |
| Calgon (Sodium Hexametaphosphate) Softener | 50 | 0.5 |
| Wingstay L Antioxidant | 50 | 1.0 |
| Trisodium Pyrophosphate | Dry | 0.5 |
| Santowhite Antioxidant | 42 | 2.0 |
| Zinc Oxide | 50 | 5.2 |
| Sulphur | 62 | 2.0 |
| Zetax (Zinc Salt of Mercaptobenzothiazole) | 50 | 1.0 |
| Vulca-cure ZB (Zinc Salt of dibutyl dithiocarbamate) | 50 | 1.0 |
| Methyl Tuads (Tetramethyl Thiuramdisulfide) | 50 | 2.0 |
| Added to the Above: | | |
| Potassium Oleate | 18 | 1.5 |
| Milblack | 35 | 1.04 |
| Ammonium Acetate Gellant | 31.25 | [1] 2.5 |

[1] Approximate.

Parts A and B were combined, mixed with the added components, foamed mechanically and coated on a carpet having a jute backing. The foam was gelled and cured by heating at 280° F. for 30 minutes. Delamination resistance was then measured and found to be 1.8 pounds per inch. The wet density of the foam was 330 g./qt. and its thickness was 3/16 in.

EXAMPLE 2

Example 1 was repeated except that 1.0 parts per 100 parts of latex solids of polydimethylsiloxane was added (Dow-Corning DC–200 fluid). The foam was found to have a delamination resistance of 4.5 pounds per inch.

EXAMPLE 3

Example 2 was repeated using only 0.25 part of the same polydimethylsiloxane per 100 parts of latex solids. Delamination resistance of the foam was 5.9 pounds per inch.

EXAMPLE 4

Example 2 was repeated, using only 0.05 part of the same polydimethylsiloxane per 100 parts of latex solids. Delamination resistance of the foam was found to be 5.9 pounds per inch.

In the foregoing examples, the polydimethylsiloxane used was Dow-Corning DC–200 fluid which has a viscosity of 200 cst. at 25° C.

EXAMPLE 5

Example 1 was repeated using also 1.0 part of a copolymer of dimethylpolysiloxane and polyoxyalkylene ether per 100 parts of latex solids. Delamination resistance was found to be 3.5 pounds per inch.

The copolymer used in this example is General Electric SF 1079 which has the following properties:

| Property: | Value |
|---|---|
| Gardner color (max.) | 7 |
| Viscosity at— | |
| 77° F. | 4500–8500 |
| 100° F. | 2900–3500 |
| 210° F. | 450–550 |
| Viscosity temperature coefficient | 0.85 |
| Specific gravity 20/20° F. | 1.055 |
| Refractive index, 25° F. | 1.45 |
| Flash point (open cup) ° F. | 440 |
| Pour point ° F. | −25 |
| pH | 7–8 |

It will be appreciated that various changes may be made in the formulations used and in the processed conditions without departing from the scope of this invention, as it is defined in the appended claims. For example, various foam weights and densities may be used. Thus the foam weight may be 10 to 70 ounces per square yard and the foam density may be 2 to 40 lbs./ft.³. Similarly, the fabric may be other than a tufted carpet, many other pile carpets being known. Therefore, the examples are to be understood to merely illustrate the invention without any intention to imply that it is of limited scope.

What is claimed is:

1. In a foam-backed carpet fabric comprising a textile carpet layer and a foam diene rubber layer selected from the group consisting of homopolymers of conjugated dienes and copolymers thereof with monoethylenically unsaturated monomers in intimate contact with said textile carpet layer;

the improvement in which there is included in said foam rubber layer a polysiloxane selected from the group consisting of (1) polysiloxanes having the formula

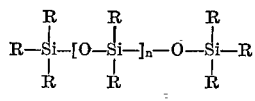

where R is a member of the group consisting of alkyl, aryl, hydroxyalkyl, aminoalkyl and cyanoalkyl and where $n$ is an integer such that the polysiloxane is a liquid at ordinary temperatures and (2) copolymers of said polysiloxanes wherein a portion of the groups R are replaced with the group

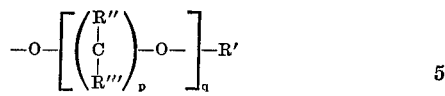

where $p$ and $q$ are integers, R' may be another polysiloxane, hydrogen or one of the groups R, and R" and R''' are hydrogen or lower alkyl, in an amount sufficient to improve the bond strength between said foam rubber layer and said textile carpet layer.

2. A carpet fabric as set forth in claim 1 in which the amount of said polysiloxane is about 0.05 to 2.0 parts per 100 parts of rubber in said foam rubber layer.

3. A carpet fabric as set forth in claim 2 in which the textile carpet layer is a tufted carpet having a woven jute backing.

4. In a foam-backed carpet fabric comprising a textile carpet layer and a foam diene rubber layer selected from the group consisting of homopolymers of isoprene, butadiene and 2-chlorobutadiene and copolymers thereof with monoethylenically unsaturated monomers in intimate contact with said textile carpet layer;

the improvement in which there is included in said foam rubber layer a polysiloxane selected from the group consisting of (1) polysiloxanes having the formula

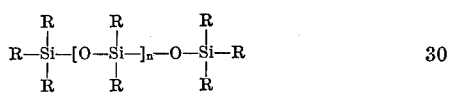

where R is a member of the group consisting of alkyl, aryl, hydroxyalkyl, aminoalkyl and cyanoalkyl and where $n$ is an integer such that the polysiloxane is a liquid at ordinary temperatures and (2) copolymers of said polysiloxanes wherein a portion of the groups R are replaced with the group

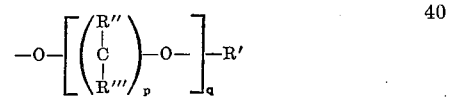

where $p$ and $q$ are integers, R' may be another polysiloxane, hydrogen or one of the groups R, and R" and R''' are hydrogen or lower alkyl, in an amount sufficient to improve the bond strength between said foam rubber layer and said textile carpet layer.

5. A carpet fabric as set forth in claim 4 in which the amount of said polysiloxane is 0.05 to 2.0 parts per 100 parts of rubber in said foam rubber layer.

6. A carpet fabric as set forth in claim 5 in which the textile carpet layer is a tufted carpet having a woven jute backing.

7. A carpet fabric as set forth in claim 6 in which in said polysiloxane, $n$ is about 8 to 200.

8. In a foam-backed carpet fabric comprising a textile carpet layer and a foam rubber layer comprising a copolymer of 10 to 40% by weight styrene and 90 to 60% by weight butadiene in intimate contact with said textile carpet layer;

the improvement in which there is included in said foam rubber lay a polysiloxane selected from the group consisting of (1) polysiloxanes having the formula

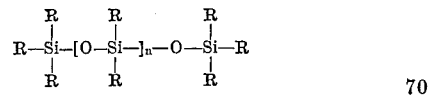

where R is a member of the group consisting of alkyl, aryl, hydroxyalkyl, aminoalkyl and cyanoalkyl and where $n$ is an integer such that the polysiloxane is a liquid at ordinary temperatures and (2) copolymers of said polysiloxanes wherein a portion of the groups R are replaced with the group

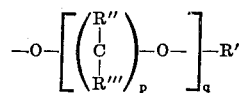

where $p$ and $q$ are integers and R' may be another polysiloxane, hydrogen or one of the groups R, and R" and R''' are hydrogen or lower alkyl, in an amount sufficient to improve the bond strength between said foam rubber layer and said textile carpet layer.

9. A carpet fabric as set forth in claim 8 in which the amount of said polysiloxane is 0.05 to 2.0 parts per 100 parts of rubber in said foam rubber layer.

10. A carpet fabric as set forth in claim 9 in which the textile carpet layer is a tufted carpet having a woven jute backing.

11. A carpet fabric as set forth in claim 10 in which in said polysiloxane, $n$ is about 8 to 200.

12. A carpet fabric as set forth in claim 9 in which said foam rubber layer also contains natural rubber.

13. In a foam-backed carpet fabric comprising a textile carpet layer and a foam natural rubber layer in intimate contact with said textile carpet layer;

the improvement in which there is included in said foam rubber layer a polysiloxane selected from the group consisting of (1) polysiloxanes having the formula

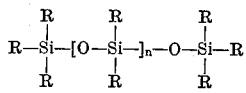

where R is a member of the group consisting of alkyl, aryl, hydroxyalkyl, aminoalkyl and cyanoalkyl and where $n$ is an integer such that the polysiloxane is a liquid at ordinary temperatures and (2) copolymers of said polysiloxanes wherein a portion of the groups R are replaced with the group

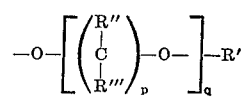

where $p$ and $q$ are integers and R' may be another polysiloxane, hydrogen or one of the groups R, and R" and R''' are hydrogen or lower alkyl, in an amount sufficient to improve the bond strength between said foam rubber layer and said textile carpet layer.

14. A carpet fabric as set forth in claim 13 in which the amount of said polysiloxane is 0.05 to 2.0 parts per 100 parts of rubber in said foam rubber layer.

15. A carpet fabric as set forth in chain 14 in which the textile carpet layer is a tufted carpet having a woven jute backing.

16. A carpet fabric as set forth in claim 15 in which in said polysiloxane, $n$ is about 8 to 200.

17. In a foam-backed carpet fabric comprising a textile carpet layer and a foam natural rubber layer in intimate contact with said textile carpet layer;

the improvement in which there is included in said foam rubber layer a polydimethylsiloxane which is a liquid at ordinary temperatures in an amount sufficient to improve the bond strength between said foam rubber layer and said textile carpet layer.

18. A carpet fabric as set forth in claim 17 in which the amount of said polydimethylsiloxane is about 0.05 to 2.0 parts per 100 parts of rubber in said foam layer.

19. A carpet fabric as set forth in claim 18 in which said textile carpet layer is a tufted carpet having a woven jute backing.

20. In a foam-backed carpet fabric comprising a textile carpet layer and a foam rubber layer comprising a copolymer of 10 to 40% by weight styrene and 90 to 60% by weight butadiene in intimate contact with said textile carpet layer;

the improvement in which there is included in said foam rubber layer a polydimethylsiloxane which is a liquid at ordinary temperatures in an amount sufficient to improve the bond strength between said foam rubber layer and said textile carpet layer.

21. A foam-backed carpet fabric as set forth in claim 20 in which the amount of said polydimethylsiloxane is about 0.05 to 2.0 parts per 100 parts of rubber in said foam layer.

22. A foam-backed carpet fabric as set forth in claim 21 in which said textile carpet layer is a tufted carpet having a woven jute backing.

23. A carpet fabric as set forth in claim 21 in which said foam rubber layer also contains natural rubber.

References Cited

UNITED STATES PATENTS

| | | |
|---|---|---|
| 2,640,087 | 5/1953 | Barton. |
| 3,175,936 | 3/1965 | Squier et al. _____ 161—66 XR |
| 3,194,773 | 7/1965 | Hostettler _____ 260—2.5 |
| 3,255,140 | 6/1966 | Sinn et al. |

ROBERT F. BURNETT, Primary Examiner

R. H. CRISS, Assistant Examiner

U.S. Cl. X.R.

161—67, 159; 260—2.5